United States Patent Office 3,373,204
Patented Mar. 12, 1968

3,373,204
PROCESS FOR PREPARING OXYALKYLENE AMINES
Ralph A. Hales, West Chester, Pa., and Francis A. Hughes, Wilmington, Del., assignors to Atlas Chemical Industries, Inc., Wilmington, Del., a corporation of Delaware
No Drawing. Filed Apr. 15, 1964, Ser. No. 360,129
7 Claims. (Cl. 260—570.7)

ABSTRACT OF THE DISCLOSURE

Process of producing secondary amines which comprises reacting in the liquid phase a polyoxyalkylene derivative of phenol, alcohol, or amine with an aminating agent at a temperature from 200° C. to 275° C. for at least two hours in the presence of a Raney metal catalyst, with water evolution as it is formed, and recovering a reaction product predominating in secondary amines.

The present invention relates to a process for preparing oxyalkylene amines and in particular to a reaction product of aminating agent and an alkyoxylated material containing a predominance of secondary amines.

The amines of the present invention are useful in the solubilization of other materials, for example, as an emulsifier for insecticides and herbicides, and as a detergent additive for lubricating oils. The present amines are also useful chemical intermediates, for example, as modifiers in polyurethane compositions, coating, castings, fibers and foams.

In accord with the present invention a polyoxyalkylene derivative of an organic compound selected from the group consisting of phenols, alcohols and amines is reacted with an aminating agent selected from the group consisting of ammonia and primary amines. Suitable primary amines contain from 1 to 6 carbon atoms. Suitably the polyoxyalkylene derivative contains from 5 to 40 moles of alkylene oxide units selected from the group consisting of ethylene oxide units and propylene oxide units. The organic compound from which the polyoxyalkylene derivative is derived may be aromatic, for example; phenol derivatives such as nonyl phenol, octyl phenol, dodecyl phenol, or diamyl phenol, or the organic compound may be aliphatic, for example; alcohols, such as sorbitol, mannitol, glycerin, dodecyl, tridecyl, hexadecyl, octadecyl, or octadecenyl; or amines, such as lauryl amine, hexadecyl amine, octadecyl amine (i.e. Armeen TD), rosin amine, or fatty diamines (i.e. Duomeen T). Preferably the polyoxyalkylene derivative contains from 14 to 100 carbon atoms.

Aminating agents which are useful in the present invention are ammonia and primary amines. Suitably the primary amines contain from 1 to 6 carbon atoms. Examples of aminating agents useful in the present invention include ammonia, methyl amine, ethyl amine, ethylene diamine, diethylene triamine, triethyl tetramine, and tetraethyl pentamine.

The process of the present invention produces a product which contains a predominance of secondary amines. The present process is advantageous in that it may be carried out at atmospheric pressures.

While generally Raney-type metal hydrogenation catalysts are useful in carrying out the amination step of the present invention, particularly good results are usually obtained when Raney nickel is employed. Sufficient catalyst is generally used to catalyze the process at a reasonable rate. Generally amounts upwards from about 0.5% by weight of the starting polyoxyalkylene derivative is sufficient to fulfill this requirement. Generally amounts of catalyst of over about 5.0% by weight of the starting material yield no obvious improvement.

In carrying out the amination reaction of the present invention, it is desirable to avoid unduly high temperatures which would reduce the yield of the aminated polyoxyalkylene derivative product by scission. The present invention therefore, utilizes temperatures which are sufficiently high to carry out the amination reaction at a reasonable rate but not high enough to cause undue decomposition of the starting material or product. Temperatures of up to about 275° C. generally may be employed without difficulty due to decomposition. Temperatures of 200° C. and higher generally cause the reaction to proceed at practical rates. A temperature range of between about 200° C. and about 250° C. has been found to be eminently suited for carrying out the amination reaction of the present invention. Generally heating for a period of at least 2 hours at a temperature in the foregoing range produces the amine products of the present invention. Usually heating for periods of over about 5 hours produce only a small increase in yield and generally are not utilized. The present reaction proceeds well at near atmospheric pressures, i.e., pressures of from about 0.5 atmosphere to about 2 atmospheres are eminently suited for carrying out the present invention.

After the amination reaction, the aminated reaction product may be recovered by filtering the catalyst out and then stripping off any water or other volatile components. Preferably this step is carried out under vacuum. The reaction product predominates in secondary amines.

The following examples illustrate the process of the present invention:

Example 1

1161 grams of polyoxyethylene 6 tridecyl alcohol was added to a 2 liter flask fitted with a stirrer, a condenser take-off open to the atmosphere, and a gas inlet tube positioned below the surface of the alcohol ether starting material. Raney nickel catalyst containing 43 grams of nickel wetted with ethyl alcohol were introduced into the flask and the air in the flask was replaced with nitrogen. The flask and contents were then heated to 160° C. Liquid ammonia from a small cylinder positioned on a balance was fed into the gas inlet tube at a slow rate. The water evolution was slow at 160° C. and the temperature was gradually increased to 220° C. over a period of 1 hour and then held at 220° C. for a period of 4 hours while continuously bubbling ammonia through the flask contents. A total of 65 grams of ammonia were used. The recovered condensate separated into 2 layers. The upper layer (organic) weighed 39 grams and the lower layer (aqueous) weighed 52 grams. After the 4 hour heating period was completed, the heat was removed and nitrogen was bubbled through the reaction product while the product cooled. The cooled reaction product was then filtered to remove the catalyst and the filter cake rinsed with water. The filtrate and wash was then stripped under vacuum to separate the product from the water. The recovered product was found to weigh 1040 grams. The product was found to contain 1.94% by weight of nitrogen by the Dumas method and 1.37% by weight by the Kjeldahl method. The total amino nitrogen was found to be 1.25% by weight by direct titration with standard $HClO_4$ in acetic acid. The product was found to contain 0.16% by weight of primary amino nitrogen by reaction with 2,5-pentanedione and titration of the excess reagent (method described in Anal. Chem., vol. 29, pp. 1174–6, 1957). The product was found to contain 0.08% of tertiary amino nitrogen by direct titration with $HClO_4$ in acetic acid after reaction of the primary and secondary amino nitrogen with acetic anhydride to form amides. The amount of secondary amino nitrogen was found to be 1.01% by weight by difference.

Example 2

3080 grams of polyoxyethylene 5 nonyl phenol was placed in a 2 liter flask equipped as in Example 1. Raney nickel catalyst containing 80 grams of nickel wetted with ethyl alcohol was added and the procedure of Example 1 followed except that the flask contents were heated to 220° C. and ammonia bubbled through for a period of 3.75 hours. Over the period 130 grams of ammonia were used. At the end of 2.75 hours a sample was recovered and analyzed. The product and the sample were analyzed in a similar manner to that described in Example 1. The following table shows the amine fractions of the product and sample in percent by weight.

| Reaction Time | Total Amino Nitrogen | Primary Amino Nitrogen | Tertiary Amino Nitrogen | Secondary Amino Nitrogen |
|---|---|---|---|---|
| 2.75 hrs | 0.57 | 0.22 | 0.04 | 0.31 |
| 3.75 hrs | 0.84 | 0.28 | 0.07 | 0.49 |

Example 3

The procedure of Example 1 was followed except that 2233 grams of polyoxyethylene 20 Armeen TD was utilized as the starting oxyalkylated material. Armeen TD consists of 97% by weight of a primary amine by titration, has a mol combining weight of 271, an M.P. of approximately 41° C. and the primary amine portion has a mean mol weight of 263 and is composed of approximately 30% by weight hexadecyl, 25% octadecyl and 45% octadecenyl amines. Raney nickel catalyst containing 75 grams of nickel wetted with ethyl alcohol was added to the Armeen TD. The flask was heated to 220° C. and ammonia bubbled through for a period of 5.0 hours. Over the period 128 grams of ammonia were used. The product was recovered as in Example 1 and found to weight 1970 grams. A sample was taken after a reaction time of 3.5 hours and analyzed. The product and sample were analyzed as in Example 1. The following table shows the amine fractions of the product and sample in percent by weight.

| Reaction Time | Total Amino Nitrogen | Primary Amino Nitrogen | Tertiary Amino Nitrogen | Secondary Amino Nitrogen |
|---|---|---|---|---|
| 3.5 hrs | 2.36 | 0.11 | 1.24 | 1.01 |
| 5.0 hrs | 2.25 | 0.24 | 1.27 | 0.74 |

An analysis of the starting material showed 1.13% by weight of amino nitrogen consisting of 0.01% primary amino nitrogen, 1.09% tertiary amino nitrogen, and 0.03% secondary amino nitrogen. Thus the net amine fractions shown as percent by weight in the following table show the present amination to produce predominantly secondary amines.

| Reaction Time | Net Amino Nitrogen | Net Primary Amino Nitrogen | Net Tertiary Amino Nitrogen | Net Secondary Amin Nitrogen |
|---|---|---|---|---|
| 3.5 hrs | 1.23 | 0.10 | 0.15 | 0.98 |
| 5.0 hrs | 1.12 | 0.23 | 0.18 | 0.71 |

Example 4

The procedure of Example 1 was followed except that 4000 grams of polyoxypropylene 10 sorbitol was utilized as the oxyalkylated material. Raney nickel catalyst containing 100 grams of nickel was wetted with ethyl alcohol and added to the starting material. The mixture was then heated to a temperature of 210° C. and ammonia bubbled through for a period of 4.0 hours. Over the period 139 grams of ammonia were used. The product was recovered as in Example 1 and found to weigh 3680 grams. Samples were taken after 2.0, and 3.0 hours and analyzed as in Example 1. The following table shows the amine fractions of the product and samples in percent by weight.

| Reaction Time | Total Amino Nitrogen | Primary Amino Nitrogen | Tertiary Amino Nitrogen | Secondary Amino Nitrogen |
|---|---|---|---|---|
| 2.0 hrs | 0.66 | 0.04 | 0.10 | 0.52 |
| 3.0 hrs | 0.86 | 0.08 | 0.10 | 0.68 |
| 4.0 hrs | 1.09 | 0.19 | 0.0 | 0.90 |

Example 5

3857 grams of polyoxypropylene 10 sorbitol was utilized as the oxyalkylated material. Raney nickel catalyst containing 97 grams of nickel was wetted with ethyl alcohol and added to the starting material. The mixture was then heated to 210° C. and 156 grams of monomethyl amine added over a period of 3.0 hours. The recovered product was found to weigh 3563 grams. In percent by weight the amine fractions analyzed: 0.80% total amino nitrogen, 0.07% primary amino nitrogen, 0.0% tertiary amino nitrogen and 0.73% secondary amino nitrogen.

What is claimed is:

1. A process for producing secondary amines which comprises the steps of:
    reacting in the liquid phase a polyoxyalkylene derivative of a member selected from the group consisting of phenols, alcohols, and amines,
    said derivative containing from 5 to 40 moles of alkylene oxide units selected from the group consisting of ethylene oxide units and propylene oxide units,
    said derivative containing from 14 to 100 carbon atoms, and
    an aminating agent selected from the group consisting of ammonia, and primary alkyl amines, said primary alkyl amines containing from 1 to 6 carbon atoms,
    at a temperature of from 200 to 275° C.
    for a time of at least 2 hours
    in the presence of a Raney metal catalyst, with water evolution as it is formed, and
    recovering a reaction product predominating in secondary amines.

2. The process of claim 1 wherein the polyoxyalkylene derivative is a phenol derivative.

3. The process of claim 1 wherein the polyoxyalkylene derivative is an alcohol derivative.

4. The process of claim 1 wherein the polyoxyalkylene derivative in an amine derivative.

5. The process of claim 1 wherein the derivative is a polyoxyethylene derivative.

6. The process of claim 1 wherein the aminating agent is ammonia.

7. The process of claim 1 wherein the Raney metal catalyst is nickel.

References Cited

UNITED STATES PATENTS 2,285,419  6/1942  Dickey et al. _____ 260—585
2,928,877  3/1960  Jaul et al. _____ 260—585

CHARLES B. PARKER, *Primary Examiner.*

R. L. RAYMOND, *Assistant Examiner.*